(12) United States Patent
Helfman

(10) Patent No.: US 8,150,832 B2
(45) Date of Patent: Apr. 3, 2012

(54) METHODS AND SYSTEMS FOR AUTOMATICALLY DETERMINING A DEFAULT HIERARCHY FROM DATA

(75) Inventor: Jonathan Isaac Helfman, Half Moon Bay, CA (US)

(73) Assignee: Oracle International Corporation, Redwood Shores, CA (US)

( * ) Notice: Subject to any disclaimer, the term of this patent is extended or adjusted under 35 U.S.C. 154(b) by 459 days.

(21) Appl. No.: 12/399,211

(22) Filed: Mar. 6, 2009

(65) Prior Publication Data

US 2010/0228739 A1 Sep. 9, 2010

(51) Int. Cl.
*G06F 7/00* (2006.01)
(52) U.S. Cl. ......... 707/708; 707/778; 707/809; 715/713
(58) Field of Classification Search .................. 707/708
See application file for complete search history.

(56) References Cited

U.S. PATENT DOCUMENTS

| 7,062,502 | B1 | 6/2006 | Kesler |
| 7,401,094 | B1 | 7/2008 | Kesler |
| 7,536,413 | B1 * | 5/2009 | Mohan et al. .......................... 1/1 |
| 2008/0228767 | A1 * | 9/2008 | Kenedy et al. .................... 707/6 |

* cited by examiner

*Primary Examiner* — Fazlul Quader
(74) *Attorney, Agent, or Firm* — Kilpatrick Townsend & Stockton LLP

(57) ABSTRACT

This disclosure describes, generally, methods and systems for determining a natural hierarchy for a data set. The method determines one or more pair-wise combinations within the data set. The one or more pair-wise combinations each include a first field and a second field from the database. The method then determines a distinct count for each entry in the first field grouped by the second field of the one or more pair-wise combinations, and determines that the distinct counts for each entry has a value equal to one. The method further includes based on the determination that the distinct counts for each entry have a value equal to one, setting the first field in the pair-wise combination as the parent and the second field in the pair-wise combination as the child in a default hierarchy for the data set.

20 Claims, 5 Drawing Sheets

METHODS AND SYSTEMS FOR AUTOMATICALLY DETERMINING A DEFAULT HIERARCHY FROM DATA

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, to databases and, more particularly, to automatically determining a default hierarchy for a data set within a database.

BACKGROUND

Typically, enterprise applications organize data in a hierarchical manner in order to facilitate accessing, manipulating, visualizing, and understanding of the data and associated information. Hierarchical organization of a dataset is designed and implemented manually and then represented explicitly in the form of, for example, a data warehouse, an online analytical processing (OLAP) cube, meta-data associated with an ad-hoc relational schema, etc. Such approaches are problematic because they involve significant overhead for design, implementation, maintenance, and so forth. Hence, a method for reducing or even eliminating the overhead associated with design of hierarchical data organizations and minimizing the overhead associated with implementation is needed in the art.

BRIEF SUMMARY

Embodiments of the present invention are directed to a computer implemented method of determining a natural hierarchy for a data set. The method includes receiving a data set which is stored in a database, and analyzing the data set to determine categories and quantities included within the data set. Further, based on the determined categories the method determines one or more pair-wise combinations within the data set. The one or more pair-wise combinations each include a first field and a second field from the database. The method then determines a distinct count for each entry in the first field grouped by the second field of the one or more pair-wise combinations, and determines that the distinct count for each entry has a value equal to one. The method further includes, based on the determination that the distinct counts for each entry have a value equal to one, setting the first field in the pair-wise combination as the parent and the second field in the pair-wise combination as the child in a default hierarchy for the data set.

In a further embodiment, a system for determining a natural hierarchy for a data set is described. The system includes a storage device configured to store a database comprising a data set, and a computer system coupled with the storage device. The computer system is configured to execute the following commands. The commands include receiving the data set from the database, analyzing the data set to determine a plurality of categories included within the data set, and based on the determined plurality of categories, determining one or more pair-wise combinations within the data set, wherein the one or more pair-wise combinations each include a first field and a second field from the database.

The commands further include determining a distinct count for each entry in the first field grouped by the second field of the one or more pair-wise combinations, determining that the distinct counts for each entry has a value equal to one, and based on the determination that the distinct count for each entry have a value equal to one, setting the first field in the pair-wise combination as the parent and the second field in the pair-wise combination as the child in a default hierarchy for the data set.

In an alternative embodiment, a machine-readable medium is described. The machine-readable medium includes instructions for determining a natural hierarchy for a data set. The machine-readable medium includes instructions for receiving a data set which is stored in a database, and analyzing the data set to determine categories included within the data set. Further, based on the determined categories, the machine-readable medium includes instructions for determining one or more pair-wise combinations within the data set. The one or more pair-wise combinations each include a first field and a second field from the database. The machine-readable medium includes instructions for determining a distinct count for each entry in the first field grouped by the second field of the one or more pair-wise combinations, and determines that the distinct count for each entry has a value equal to one. The machine-readable medium further includes instructions based on the determination that the distinct counts for each entry have a value equal to one, setting the first field in the pair-wise combination as the parent and the second field in the pair-wise combination as the child in a default hierarchy for the data set.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Aspects of the present invention relate to eliminating overhead associated with design of hierarchical data organizations and minimizing overhead associated with implementation and maintenance by deriving hierarchical relationships directly from the data. Further aspects of the present invention automate one portion of the complex task of determining appropriate visualizations for hierarchical data (a task that is currently accomplished manually by specialists with multiple skills including data analysis, data visualization, user interface design, product management, product strategy, etc.

Furthermore, according to aspects of the present invention for very large datasets several representations may exist for visualizing hierarchical data such as clustered or stacked bar graphs and treemaps. For these representations to be used, a hierarchical relationship in the dataset must be identified and explicitly mapped to the appropriate features in the representation, such as bar clusters, bar segments, and nested rectangles, respectively. While data may be organized in practically any associated hierarchy, there are certain hierarchies that may make more sense to users and therefore may be the most reasonable ones to use in a default or initial view of the data. Such a hierarchy may be, for example, of "product family, product, component" for data associated with products. Thus, aspects of the present invention eliminate any overhead associated with identifying such a "natural" hierarchy making it possible to automate the process of providing a meaningful default view of hierarchical data.

Figure 1:
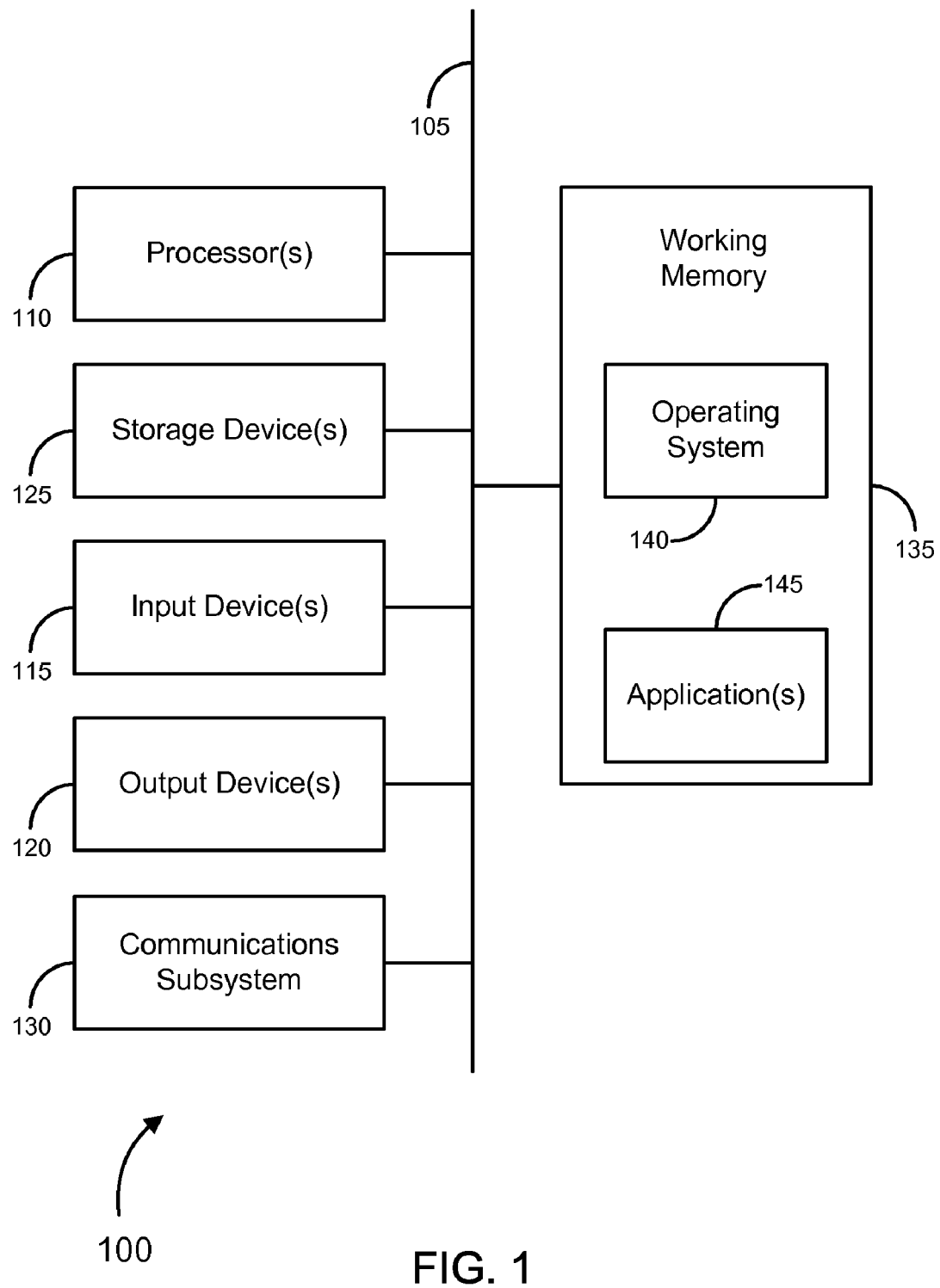
FIG. 1 is a generalized schematic diagram illustrating a computer system, in accordance with various embodiments of the invention.

FIG. 1 provides a schematic illustration of one embodiment of a computer system 100 that can perform the methods of the invention, as described herein. It should be noted that FIG. 1 is meant only to provide a generalized illustration of various components, any or all of which may be utilized as appropriate. FIG. 1, therefore, broadly illustrates how individual system elements may be implemented in a relatively separated or relatively more integrated manner.

The computer system 100 is shown comprising hardware elements that can be electrically coupled via a bus 105 (or may otherwise be in communication, as appropriate). The hardware elements can include one or more processors 110, including without limitation, one or more general purpose processors and/or one or more special purpose processors (such as digital signal processing chips, graphics acceleration chips, and/or the like); one or more input devices 115, which can include without limitation a mouse, a keyboard and/or the like; and one or more output devices 120, which can include without limitation a display device, a printer and/or the like.

The computer system 100 may further include (and/or be in communication with) one or more storage devices 125, which can comprise, without limitation, local and/or network accessible storage and/or can include, without limitation, a disk drive, a drive array, an optical storage device, solid state storage device such as a random access memory ("RAM") and/or a read-only memory ("ROM"), which can be programmable, flash updateable and/or the like. The computer system 100 might also include a communications subsystem 130, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 130 may permit data to be exchanged with a network (such as the network described below, to name one example), and/or any other devices described herein. In many embodiments, the computer system 100 will further comprise a working memory 135, which can include a RAM or ROM device, as described above.

The computer system 100 also can comprise software elements, shown as being currently located within the working memory 135, including an operating system 140 and/or other code, such as one or more application programs 145, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 125 described above. In some cases, the storage medium might be incorporated within a computer system, such as the system 100. In other embodiments, the storage medium might be separate from a computer system (i.e., a removable medium, such as a compact disc, etc.), and is provided in an installation package, such that the storage medium can be used to program a general purpose computer with the instructions/code stored thereon. These instructions might take the form of executable code, which is executable by the computer system 100 and/or might take the form of source and/or installable code, which, upon compilation and/or installation on the computer system 100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 100) to perform methods of the invention. According to a set of embodiments, some or all of the procedures of such methods are performed by the computer system 100 in response to processor 110 executing one or more sequences of one or more instructions (which might be incorporated into the operating system 140 and/or other code, such as an application program 145) contained in the working memory 135. Such instructions may be read into the working memory 135 from another machine-readable medium, such as one or more of the storage device(s) 125. Merely by way of example, execution of the sequences of instructions contained in the working memory 135 might cause the processor(s) 110 to perform one or more procedures of the methods described herein.

The terms "machine-readable medium" and "computer readable medium," as used herein, refer to any medium that participates in providing data that causes a machine to operate in a specific fashion. In an embodiment implemented using the computer system 100, various machine-readable media might be involved in providing instructions/code to processor(s) 110 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 125. Volatile media includes, without limitation, dynamic memory, such as the working memory 135. Transmission media includes coaxial cables, copper wire and fiber optics, including the wires that comprise the bus 105, as well as the various components of the communications subsystem 130 (and/or the media by which the communications subsystem 130 provides communication with other devices). Hence, transmission media can also take the form of waves (including without limitation radio, acoustic and/or light waves, such as those generated during radio wave and infrared data communications).

Common forms of physical and/or tangible computer-readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 130 (and/or components thereof) generally will receive the signals, and the bus 105 then might carry the signals (and/or the data, instructions, etc., carried by the signals) to the working memory 135, from which the processor(s) 105 retrieves and executes the instructions. The instructions received by the working memory 135 may optionally be stored on a storage device 125 either before or after execution by the processor(s) 110.

Figure 2:
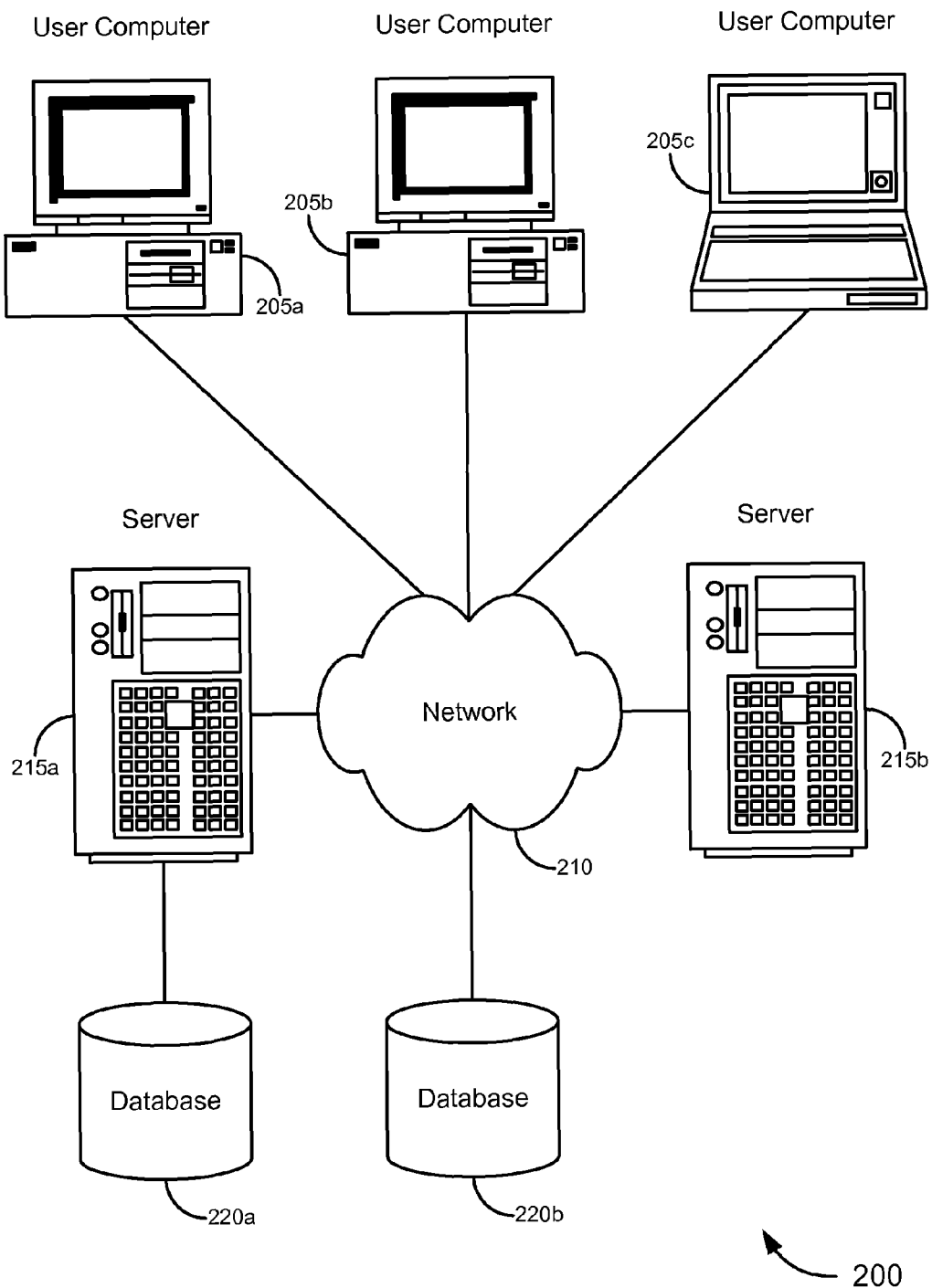
FIG. 2 is a block diagram illustrating a networked system of computers, which can be used in accordance with various embodiments of the invention.

Merely by way of example, FIG. 2 illustrates a schematic diagram of a system 200 that can be used in accordance with one set of embodiments. The system 200 can include one or more user computers 205. The user computers 205 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 205 can also have any of a variety of applications, including one or more applications configured to perform methods of the invention, as well as one or more office applications, database client and/or server applications, and web browser applications. Alternatively, the user computers 205 can be any other electronic device, such as a thin-client computer, Internet-enabled mobile telephone, and/or personal digital assistant (PDA), capable of communicating via a network (e.g., the network 210 described below) and/or displaying and navigating web pages or other types of electronic documents. Although the exemplary system 200 is shown with three user computers 205, any number of user computers can be supported.

Certain embodiments of the invention operate in a networked environment, which can include a network 210. The network 210 can be any type of network familiar to those skilled in the art that can support data communications using any of a variety of commercially available protocols, including without limitation TCP/IP, SNA, IPX, AppleTalk, and the like. Merely by way of example, the network 210 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infrared network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 215. Each of the server computers 215 may be configured with an operating system, including without limitation any of those discussed above, as well as any commercially (or freely) available server operating systems. Each of the servers 215 may also be running one or more applications, which can be configured to provide services to one or more clients 205 and/or other servers 215.

Merely by way of example, one of the servers 215 may be a web server, which can be used, merely by way of example, to process requests for web pages or other electronic documents from user computers 205. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 205 to perform methods of the invention.

The server computers 215, in some embodiments, might include one or more application servers, which can include one or more applications accessible by a client running on one or more of the client computers 205 and/or other servers 215. Merely by way of example, the server(s) 215 can be one or more general purpose computers capable of executing programs or scripts in response to the user computers 205 and/or other servers 215, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 205 and/or another server 215. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 205 via a web server (as described above, for example). Similarly, a web server might receive web page requests and/or input data from a user computer 205 and/or forward the web page requests and/or input data to an application server. In some cases a web server may be integrated with an application server.

In accordance with further embodiments, one or more servers 215 can function as a file server and/or can include one or more of the files (e.g., application code, data files, etc.) necessary to implement methods of the invention incorporated by an application running on a user computer 205 and/or another server 215. Alternatively, as those skilled in the art will appreciate, a file server can include all necessary files, allowing such an application to be invoked remotely by a user computer 205 and/or server 215. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 220. The location of the database(s) 220 is discretionary. Merely by way of example, a database 220a might reside on a storage medium local to (and/or resident in) a server 215a (and/or a user computer 205). Alternatively, a database 220b can be remote from any or all of the computers 205, 215, so long as the database can be in communication (e.g., via the network 210) with one or more of these. In a particular set of embodiments, a database 220 can reside in a storage-area network ("SAN") familiar to those skilled in the art. (Likewise, any necessary files for performing the functions attributed to the computers 205, 215 can be stored locally on the respective computer and/or remotely, as appropriate.) In one set of embodiments, the database 220 can be a relational database, such as an Oracle™ database, that is adapted to store, update, and retrieve data in response to SQL-formatted commands. The database might be controlled and/or maintained by a database server, as described above, for example.

Figure 3:
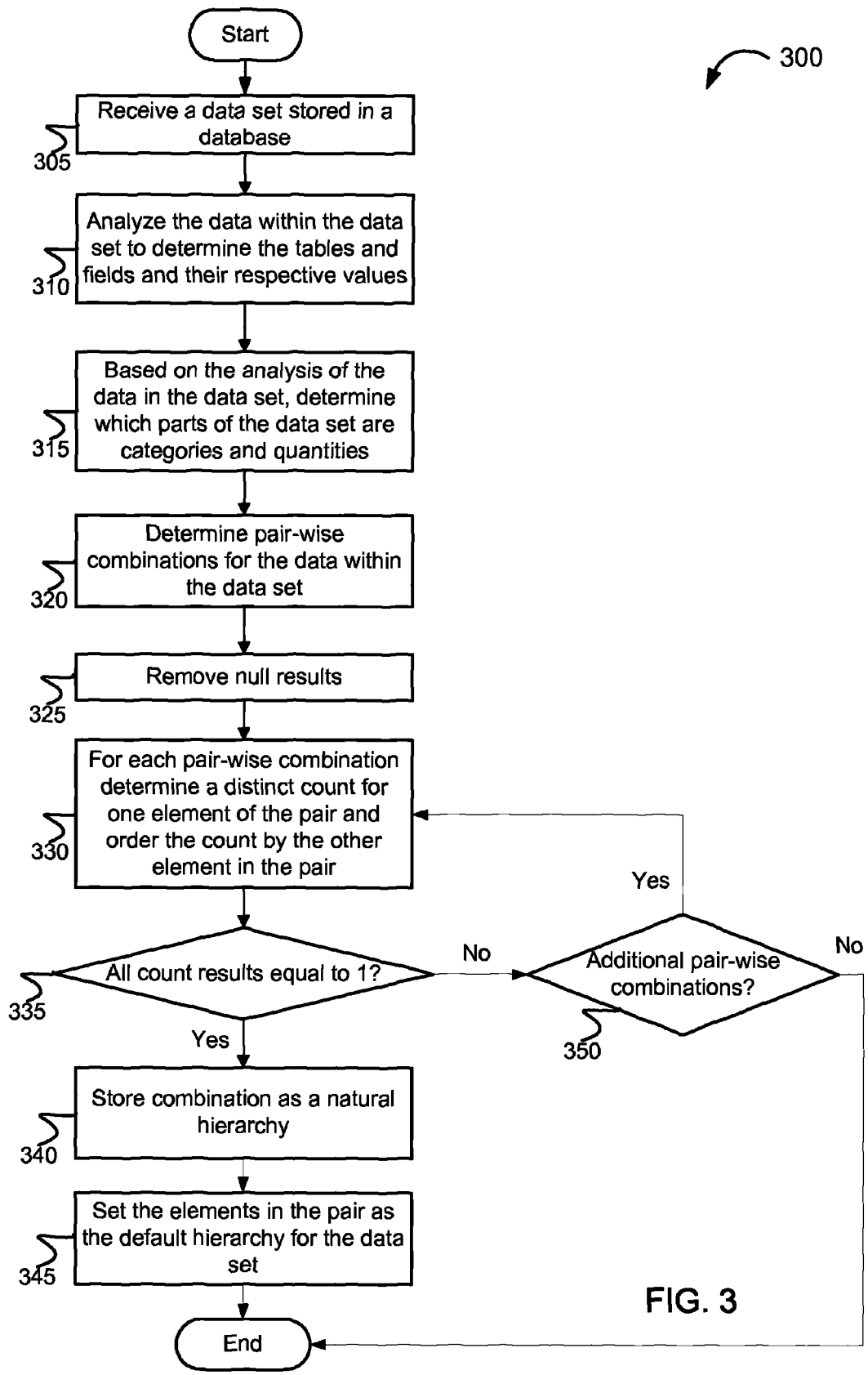
FIG. 3 is a flow diagram illustrating a method of determining a default hierarchy for a data set, in accordance with various embodiments of the invention.

Turning now to FIG. 3, the figure illustrates a method 300 of determining a default hierarchy for a data set, in accordance with various embodiments of the invention. At process block 305, a data set which may be stored in a database is received by, for example, a computer system such as a server. The server may be a database server which maintains and provides access to the database which stores to data set. The data set may include data related to employees in a company, automobile parts, products or a certain brand or type, bug reports for a software program or programs, etc. Furthermore, the data set may be a data warehouse, an online analytical processing (OLAP) cube, meta-data associated with an ad-hoc relational schema, etc.

At process block 310, an analysis of the data within the data set may be performed in order to determine the tables and fields within the data set, and the repetitive values. For example, a product database for shoes may include a shoes table which may in turn include fields for shoe brand, shoe type, shoe material, shoe quantity, shoe price, etc. Then based on the determined tables and fields, a determination of which fields are categories and which fields are quantities is made (process block 315). In one embodiment, such a determination may be made based on the data type of the fields. For example, a VarChar data type would be a category, while an int, float, double, etc. would be a quantity.

At process block 320, pair-wise combinations within the data set may be determined. For example, if the data set contained one table with three category fields, then there would be nine possible pair-wise combinations (i.e., (category 1, category 2), (category 2, category 1), (category 1, category 3), etc.). In addition, at process block 325, any "null" values may be removed from the results of the pair-wise combinations. As such "is not null" may be added at the end of the SQL query. Furthermore, at process block 330, for each pair-wise combination a distinct count is made for the first element of the pair when grouped by the second element of the pair. In one embodiment, the following SQL function may be used: "select count (distinct FIRST ELEMENT) from TABLE grouped by SECOND ELEMENT."

Accordingly, a determination is made whether the results for each entry of the query equals a value of one (decision block 335). If the result of the query for each entry is equal to one, then the pair-wise combination is a natural hierarchy for the data within the data set. For example, if the pair-wise combination for a given data set is item-category and item, and item-category is a "natural" a parent of item, then the SQL query "select count (distinct item-category) from item_table grouped by item is not null" would return all values of one for each entry. Accordingly, item-category to item would be a natural hierarchy for the data set.

Hence, at process block 340, the pair-wise combination may be stored as a determined natural hierarchy, and then the elements in the pair may be set as the default hierarchy for the data within the data set (process block 345). Thus, instead of a database administrator or other analyst being required to manually determine the natural hierarchy for the data set, the natural hierarchy is automatically determined and set as the default, which in turn significantly reduces the cost and time associated with such a determination. Alternatively, if the result of the query is not all values of one, then at decision block 350, a determination is made whether additional pair-wise combinations exist. If additional pair-wise combinations exist, then process moves back to process block 325, otherwise the process is ended.

Figure 4:
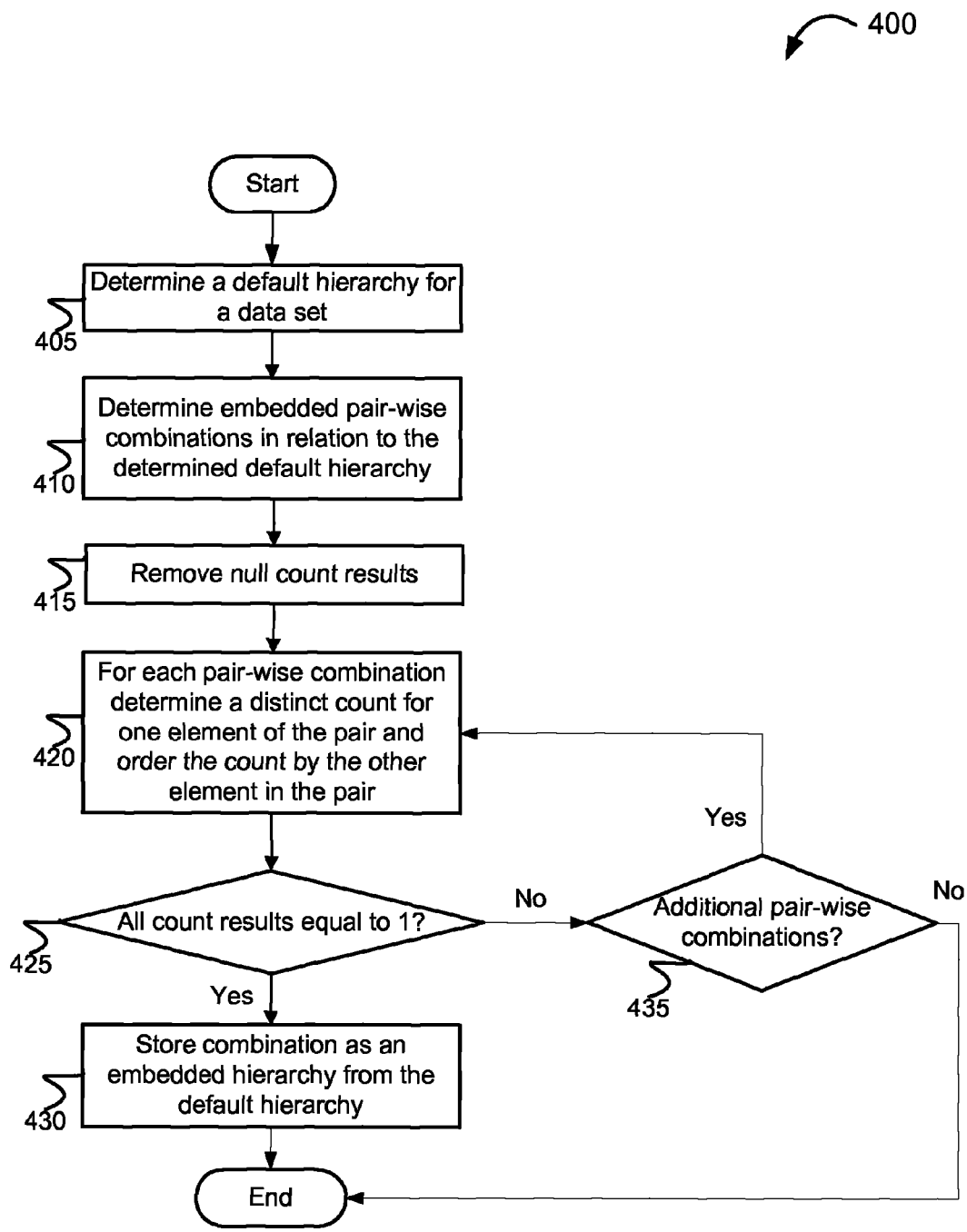
FIG. 4 is a flow diagram illustrating an alternative method of determining a default hierarchy for a data set, in accordance with various embodiments of the invention.

Referring next to FIG. 4, the figure illustrates a method 400 of determining a default hierarchy for a data set, in accordance with various embodiments of the invention. At process block 405 a default (or natural) hierarchy is determined based on method 300 described above in FIG. 3. Once the default hierarchy has been established, at process block 410, embedded pair-wise combinations in relation to the default hierarchy may be determined.

Furthermore, at process block 415, the null results are also removed, and then for each of the embedded pair-wise combinations, a determination is made whether the distinct count is equal to one (process block 420). If the count results are all equal to one (decision block 425), then the pair-wise combination is stored as an embedded hierarchy (process block 430). In one embodiment, an embedded hierarchy may be a hierarchy that has three or more levels. For example, a grandparent-parent-child hierarchy may exist such as product-category to product-family to product. Accordingly, any number of embedded hierarchies may be determined by implementing methods 300 and 400.

Alternatively, if the count does not all equal one, then a determination is made whether additional embedded pair-wise combinations exist (decision block 435). If additional embedded pair-wise combinations exist, then the process returns to process block 415, otherwise the process ends.

Figure 5:
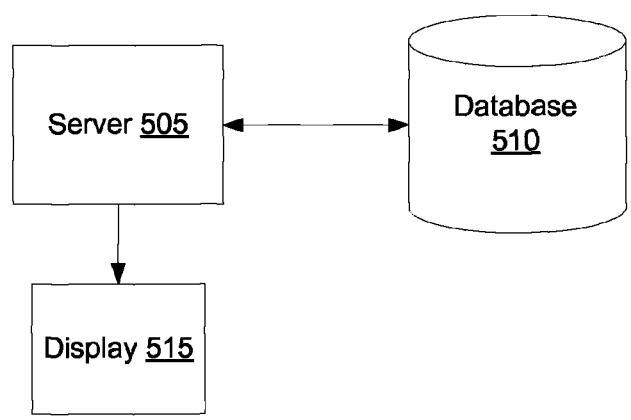
FIG. 5 is a block diagram illustrating a system which may be used for determining a default hierarchy for a data set, in accordance with various embodiments of the invention.

Now turning to FIG. 5, the figure illustrates a system 500 which may be used for determining a default hierarchy for a data set, in accordance with various embodiments of the invention. In one embodiment, system 500 may include a server 505 coupled with a database 510 and a display 515. Server 505 may be configured to implement methods 300 and 400 from FIGS. 3 and 4. Accordingly, server 505 may access data sets stored in database 510, and determine the natural hierarchies for the data sets and set such hierarchies as the default hierarchy for each data set within database 510.

Furthermore, based on the determined default hierarchies, graphical representations of the data sets may be displayed on display 515. In one embodiment, display 515 may be a CRT display, an LCD display, a LED display, a plasma display, etc. In a further embodiment, the graphical representations may be, for example, a clustered graph, a bar chart, a stacked bar graph, a treemap, a pie chart, etc. As such, because the natural hierarchy for each data set stored within database 510 is determined, graphical representations of the data in the data sets can be readily displayed without an administrator or analyst manually making such a natural hierarchy determination.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with-or without-certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of determining a natural hierarchy for a data set, the method comprising:
  receiving, at a computer system, a data set, wherein the data set is stored in a database;
  analyzing, at the computer system, the data set to determine a plurality of categories and a plurality of quantities included within the data set;
  based on the determined plurality of categories and quantities, determining, at the computer system, one or more pair-wise combinations within the data set, wherein the one or more pair-wise combinations each include a first field and a second field from the database;
  determining, at the computer system, a distinct count for each entry in the first field grouped by the second field of the one or more pair-wise combinations;
  determining, at the computer system, that the distinct count for each entry has a value equal to one;
  based on the determination that the distinct counts for each entry have a value equal to one, setting the first field in the pair-wise combination as the parent and the second field in the pair-wise combination as the child in a default hierarchy for the data set, wherein the natural hierarchy is the most appropriate hierarchy for the data set based on the data within the data set;
  determining a visual representation most suited for the natural hierarchy, based on structural aspects of the natural hierarchy; and
  mapping features of the visual representation to the structural aspects of the natural hierarchy.

2. The method of claim 1, further comprising filtering out the distinct counts for any entry that have a null value.

3. The method of claim 1, further comprising determining that the distinct counts for each entry have a value not equal to one.

4. The method of claim 3, further comprising, based on the distinct counts for each entry having a value not equal to one, determining if there are additional pair-wise combinations within the data set.

5. The method of claim 4, further comprising, based on having additional pair-wise combinations within the data set, determining, at the computer system, a distinct count for each entry in a first field grouped by a second field of the additional pair-wise combinations.

6. The method of claim 5, wherein a determination is made for each additional pair-wise combination until either a pair-wise combination which generates a count with a value equal to one is determined or all pair-wise combinations have been distinctly counted.

7. The method of claim 1, further comprising displaying data within the data set in a graphical format based on the determined default hierarchy.

8. The method of claim 7, wherein the graphical representation is displayed on a display device.

9. The method of claim 8, wherein the display device comprises one or more of the following: an LCD display, a CRT display, an LED display, and a plasma display.

10. The method of claim 7, wherein graphical representation comprises one or more of the following: clustered graph, bar chart, stacked bar graph, treemap, and pie chart.

11. The method of claim 1, wherein the natural hierarchy comprises a default hierarchy based on the data within the data set.

12. The method of claim 11, wherein the natural hierarchy comprises a hierarchy for the data within the data set which is configured to generate a logical parent-child relationship for the data set.

13. The method of claim 1, wherein the natural hierarchy comprises a one to many relationship between the first field and the second field.

14. The method of claim 1, wherein the data set comprises one or more of the following: an online analytical processing (OLAP) cube, meta-data associated with an ad-hoc relational schema, and a data warehouse.

15. The method of claim 1, wherein the determining of the distinct count for each entry in the first field grouped by the second field of the one or more pair-wise combinations comprises using the following SQL commands: select, count, distinct, from and group by.

16. A system for determining a natural hierarchy for a data set, the system comprising:
 a storage device configured to store a database comprising a data set; and
 a computer system coupled with the storage device, the computer system configured to execute the following commands:
  receiving the data set from the database,
  analyzing the data set to determine a plurality of categories and a plurality of quantities included within the data set,
  based on the determined plurality of categories and quantities, determining one or more pair-wise combinations within the data set, wherein the one or more pair-wise combinations each include a first field and a second field from the database,
  determining a distinct count for each entry in the first field grouped by the second field of the one or more pair-wise combinations,
  determining that the distinct counts for each entry has a value equal to one,
  based on the determination that the distinct counts for each entry have a value equal to one, setting the first field in the pair-wise combination as the parent and the second field in the pair-wise combination as the child in a default hierarchy for the data set, wherein the natural hierarchy is the most appropriate hierarchy for the data set based on the data within the data set,
  determining a visual representation most suited for the natural hierarchy, based on structural aspects of the natural hierarchy, and
  mapping features of the visual representation to the structural aspects of the natural hierarchy.

17. The system of claim 16, further comprising a display device coupled with the computer system, the display device configured to display a graphical representation of the data set based on the default hierarchy.

18. A non-transitory machine-readable medium having sets of instructions stored thereon which, when executed by a machine, cause the machine to:
 receive a data set, wherein the data set being stored in a database;
 analyze the data set to determine a plurality of categories and a plurality of quantities included within the data set;
 based on the determined plurality of categories and quantities, determine one or more pair-wise combinations within the data set, wherein the one or more pair-wise combinations each include a first field and a second field from the database;
 determine a distinct count for each entry in the first field grouped by the second field of the one or more pair-wise combinations;
 determine that the distinct counts for each entry has a value equal to one; and
 based on the determination that the distinct counts for each entry have a value equal to one, set the first field in the pair-wise combination as the parent and the second field in the pair-wise combination as the child in a default hierarchy for the data set, wherein the natural hierarchy is the most appropriate hierarchy for the data set based on the data within the data set;
 determine a visual representation most suited for the natural hierarchy, based on structural aspects of the natural hierarchy; and
 map features of the visual representation to the structural aspects of the natural hierarchy.

19. The non-transitory machine-readable medium of claim 18, wherein the sets of instructions which, when further executed by the machine, cause the machine to filter out the distinct counts for any entry that have a null value.

20. The non-transitory machine-readable medium of claim 19, wherein the sets of instructions which, when further executed by the machine, cause the machine to determine that the distinct counts for each entry have a value not equal to one.

* * * * *